US006046919A

United States Patent [19]

Madenokouji et al.

[11] Patent Number: 6,046,919

[45] Date of Patent: Apr. 4, 2000

[54] SOLAR POWER GENERATING DEVICE

[75] Inventors: Masaki Madenokouji, Saitama-ken; Keigo Onizuka, Gunma-ken; Isao Morita, Gunma-ken; Hisashi Tokizaki, Gunma-ken, all of Japan

[73] Assignee: Sanyo Electric Co., Ltd., Osaka-fu, Japan

[21] Appl. No.: 09/275,481

[22] Filed: Mar. 24, 1999

[30] Foreign Application Priority Data

Mar. 30, 1998 [JP] Japan .................................. 10-083709
Mar. 30, 1998 [JP] Japan .................................. 10-083710
Mar. 30, 1998 [JP] Japan .................................. 10-083711

[51] Int. Cl.[7] ................................................... H02M 7/521

[52] U.S. Cl. ............................. 363/98; 363/132; 323/906

[58] Field of Search ................................ 363/95, 97, 98, 363/131, 132; 323/906

[56] References Cited

U.S. PATENT DOCUMENTS 4,873,480 10/1989 Lafferty .................................. 323/229
5,493,155 2/1996 Okamoto et al. ......................... 307/45
5,838,148 11/1998 Kurokami et al. ...................... 323/299
5,869,956 2/1999 Nagao et al. ........................... 323/299
5,892,354 4/1999 Nagao et al. ........................... 323/299
5,898,585 4/1999 Sirichote et al. ....................... 363/132
5,923,158 7/1999 Kurokami et al. ...................... 323/299
5,977,659 11/1999 Takehara et al. ......................... 307/85

*Primary Examiner*—Adolf Deneke Berhane
*Attorney, Agent, or Firm*—Knobbe, Martens, Olson, Bear, LLP

[57] ABSTRACT

In order to obtain a solar power generating device capable of effectively using power generated by a solar cell, the virtual optimum operating voltage, the MPPT minimum voltage, the MPPT maximum voltage, and the low and high voltage change width switching voltages used when MPPT control is carried out are calculated on the basis of the output voltage of a solar panel immediately before the startup of the inverter circuit in the solar power generating device and the MPPT control is carried out on the basis of each of the calculated voltage values.

20 Claims, 10 Drawing Sheets

SOLAR POWER GENERATING DEVICE

BACKGROUND OF THE INVENTION

1. Field of the Invention

The present invention relates to a solar power generating device and, in particular, to a solar power generating device for tracking the operating point of a solar cell at the maximum point thereof.

2. Description of the Related Art

The output voltage-output current characteristic of the solar cell used in the solar power generating device are expressed by the curved line shown in FIG. 4A. Accordingly, the output voltage-output power characteristic of the solar cell are expressed by the curved line shown in FIG. 4 B. Namely, while the output voltage of the solar cell is between 0 (V) and a predetermined voltage, the output power steadily increases. However, once the output voltage of the solar cell exceeds the predetermined voltage the output power steadily decreases. The output power at the above-described predetermined voltage is taken as the maximum power of the solar cell, and the operating point of the solar cell at the above-described predetermined voltage is called the maximum power point $P_M$ of the solar cell.

As a control for producing the maximum power from a solar cell having this type of characteristic, a maximum power point tracking control (hereinafter, referred to as MPPT control) is known in which the operating point of the solar cell constantly tracks the maximum power point $P_M$.

This MPPT control causes a designated voltage value which becomes the solar cell operating voltage target value to change slightly at predetermined intervals and compares the output power from the solar cell measured at this time with the value measured at the previous time. By changing the above-described designated voltage value in the direction in which the output power is constantly increasing, the MPPT control can bring the solar cell operating point close to the maximum output point (the optimum operating point).

Conventionally, this type of MPPT control was carried out so that, in order for the solar cell operating point to reach the maximum power point in a short time when the solar cell was started, each of the virtual optimum operating voltage, the MPPT minimum voltage $V_L$, and the MPPT maximum voltage $V_H$ (depending on the type of solar cell being used) were set as fixed values and the output power from the solar cell in the range only between the MPPT minimum voltage $V_L$ and the MPPT maximum voltage $V_H$ was set as the maximum.

However, the solar cell output voltage-output power characteristic is determined not only by the type of solar cell, but also varies according to the amount of solar radiation and changes in the temperature around the periphery of the cell which accompany seasonal and other variations. Namely, as is shown in FIG. 5, the output voltage-output power characteristic changes in the direction in which the optimum operating voltage decreases as the solar cell peripheral temperature increases. Moreover, the output voltage-output power characteristic changes in the direction in which the optimum operating voltage increases when the amount of solar radiation increases.

However, in the aforementioned conventional MPPT control, because the virtual optimum operating voltage, the MPPT minimum voltage $V_L$, and the MPPT maximum voltage $V_H$ (depending on the type of solar cell being used) were set as fixed values, there were instances when the actual optimum operating voltage was not inside the range between the MPPT minimum voltage $V_L$ and the MPPT maximum voltage $V_H$, which had been set as fixed values, because of factors such as the temperature around the periphery of the solar cell. This led to the problem that the power generated by the solar cell was not able to be used effectively.

Further, the output voltage-output power characteristic differs depending on the total surface area of the solar cell. Generally, when a solar power generating device is installed, a plurality of solar cell panels are connected in series so as to obtain a predetermined output power. However, depending on conditions such as the size of the location where the panels are installed and the environment around that location, the number of solar cell panels which can actually be installed sometimes differ, leading to the output voltage-output power characteristic to also differ greatly. Therefore, the problem exists that, conventionally, the generated power of an actually installed solar cell can not be effectively used because data such as the virtual optimum operating voltage are set in advance as fixed values.

SUMMARY OF THE INVENTION

The present invention was achieved in order to solve the above-mentioned problems and is aimed at providing a solar power generating device which can effectively use the power generated by a solar cell.

In order to achieve the above-described aim, the solar power generating device according to the first aspect of the present invention comprises: a solar cell; power conversion means for converting a DC power output of the solar cell into a AC power; setting means for setting a virtual optimum operating voltage and a control voltage range of the solar cell on the basis of an output voltage of the solar cell immediately before startup of the power conversion means; and control means for changing the output voltage of the solar cell in stages by a predetermined voltage change width in the direction in which the DC power output of the solar cell increases in the control voltage range, after the power conversion means has started up with the virtual optimum operation voltage taken as a target output voltage of the solar cell.

According to the solar power generating device of the first aspect of the present invention, the DC power output of the solar cell is converted into AC power by the power conversion means.

Moreover, the virtual optimum operating voltage and the control voltage range of the solar cell are set by the setting means on the basis of the output voltage of the solar cell immediately before startup of the power conversion means. At this time, the control voltage range is taken as including the virtual optimum operating voltage.

In addition, after the power conversion means has been started up with the above-described virtual optimum operating voltage taken as the output voltage target value of the solar cell, the output voltage of the solar cell is changed by the control means in stages by a predetermined voltage change width in the direction in which the DC current output of the solar cell in the above-described control voltage range increases. Accordingly, by the operation of this control means, the MPPT control is carried out so that the solar cell operating point tracks the solar cell maximum power point on the basis of the above-described virtual optimum operating voltage and the control voltage range.

In this way, according to the solar power generating apparatus of the first aspect of the present invention, the virtual optimum operating voltage and the control voltage range used when the operating point of the solar cell is controlled so as to track the maximum power point of the solar cell are set on the basis of the output voltage of the solar cell immediately before the startup of the power conversion means. Therefore, the optimum virtual optimum operating voltage and control voltage range can be obtained in accordance with the amount of solar radiation and the temperature around the periphery of the solar cell and other such seasonal changes as well as the number of solar cell panels connected in series which are actually installed. As a result, the output power of the solar cell is able to be efficiently used.

In the solar power generating device of the second aspect of the present invention, according to the solar power generating device of the first aspect of the present invention, the setting means sets a switching range, which is a narrower range than the control voltage range and which includes the virtual optimum operating voltage, on the basis of the output voltage of the solar cell immediately before startup of the power conversion means, and the control means makes the predetermined voltage change width smaller when the output voltage is a value falling inside the switching range than when the output voltage is a value falling outside the switching range when the output voltage of the solar cell is changed in stages.

According to the solar power generating device of the second aspect of the present invention, the switching means in the solar power generating device of the first aspect of the present invention sets a switching range, which is narrower than the above-described control voltage range and which includes the above-described virtual optimum operating voltage, on the basis of the output voltage of the solar cell immediately before the startup of the power conversion means.

Further, when the output voltage of the solar cell is changed in stages, the width of the voltage change (the voltage change width) is made smaller when the output voltage is a value falling inside the above-described switching range (the output voltage is in the switching range) than when the output voltage is a value falling outside the above-described switching range (the output voltage is not in the switching range) by the control means.

In this way, according to the solar power generating device of the second aspect of the present invention, the same effect as in the solar power generating device of the first aspect of the present invention can be achieved. Moreover, when the output voltage of the solar cell is a value inside the switching range which is adjacent to the virtual optimum operating voltage, the width of the voltage change is made smaller than when the output voltage of the solar cell is a value inside the switching range which is not adjacent to the virtual optimum operating voltage. Therefore, the solar cell operating point is able to move to the maximum power point in a short time. In addition, because the above-described switching range is set on the basis of the output voltage of the solar cell immediately before the startup of the power conversion means, the optimum switching range can be set in accordance with the amount of solar radiation, the temperature surrounding the periphery of the solar cell and other seasonal changes as well as with the number of solar cell panels connected in series which are actually installed.

In the solar power generating device of the third aspect of the present invention, according to the solar power generating device of the first and second aspects of the present invention, the setting means sets a fixed voltage which is a value inside the control voltage range on the basis of the output voltage of the solar cell immediately before startup of the power conversion means, and the control means sets the output voltage of the solar cell as the fixed voltage when the DC power output of the solar cell is less than a predetermined power amount.

According to the solar power generating device of the third aspect of the present invention, a fixed voltage, which is a value inside the above-described control voltage range, is set by the setting means in the solar power generating device of the first and second aspects of the present invention on the basis of the output voltage of the solar cell immediately before startup of the power conversion means.

Moreover, the output voltage of the solar cell is set as the above-described fixed voltage when the DC power output of the solar cell is less than a predetermined power amount.

In this way, according to the solar power generating device of the third aspect of the present invention, the same effect as in the solar power generating device of the first and second aspects of the present invention can be achieved. Moreover, when the output power is low which causes unstable operation, because the output voltage of the solar cell is set as a fixed voltage, power can be generated in a stable operation from the time the output power is low until a high output power is achieved.

The solar power generating device of the fourth and fifth aspects of the present invention comprises: a solar cell; power conversion means for converting a DC power output of the solar cell into a AC power; setting means for setting a virtual optimum operating voltage, a control voltage range, and a fixed voltage on the basis of an output voltage of the solar cell immediately before the startup of the power conversion means; control means having a first mode in which the output voltage of the solar cell is changed in stages by a predetermined voltage change width in the direction in which the DC power output of the solar cell increases in the control voltage range after the virtual optimum operating voltage has been set as a target output voltage of the solar cell and the power conversion means has been started up, and a second mode in which the output voltage of the solar cell is set as the fixed voltage when the DC power output of the solar cell is smaller than a predetermined power amount; and a resetting means. However, the resetting means of the solar power generating device of the fourth aspect of the present invention is a resetting means which increases by a predetermined amount at least one of the virtual optimum operating voltage and the control voltage range of the solar cell which were set when output power of the solar cell was unstable. The resetting means of the solar power generating device of the fifth aspect of the present invention is a resetting means which resets at least one of the virtual optimum operating voltage and the control voltage range on the basis of the output power of the solar cell after stopping the operation of the power conversion means in accordance with the condition of the output power of the solar cell.

According to the solar power generating device of the fourth and fifth aspects of the present invention, the DC power output of the solar cell is converted into AC power by the power conversion means.

Moreover, the virtual optimum operating voltage, the control voltage range, and the fixed voltage are set by the setting means on the basis of the output voltage of the solar cell immediately before startup of the power conversion means. It should be noted that the control voltage range at this time includes the virtual optimum operating control voltage.

In addition, at least one of a first mode, in which the output voltage of the solar cell is changed in stages by a predetermined voltage change width in the direction in which the DC power output of the solar cell in the control voltage range increases, and a second mode, in which the output voltage of a solar cell is set as a fixed voltage when the DC power output of a solar cell is less than a predetermined power amount, is carried out by the control means, after the virtual optimum operating voltage has been set as the output voltage target value of the solar cell and the power conversion means has been started up. Accordingly, by the operation of the first mode, MPPT control is carried out so that the solar cell operating point tracks the maximum power point of the solar cell by on the basis of the above-described virtual optimum operating voltage and the control voltage range. When DC power output of the solar cell is less than a predetermined power amount, the second mode is executed and what is called constant voltage control is carried out, in which the output voltage of a solar cell is set as a fixed voltage.

In the solar power generating device of the fourth aspect of the present invention, at least one of the virtual optimum operating voltage and the control voltage range which were set is increased by a predetermined amount by the resetting means when the output power of the solar cell is unstable. Namely, as is shown in FIG. 4 A, when the output voltage of the solar cell is low then the output power of the solar cell is unstable, and the virtual optimum operating voltage and the control voltage range at this time are actually located further to the left (in the direction where the output voltage is low) of the actual maximum power point $P_M$ (See FIG. 4 B). Consequently, by increasing by a predetermined amount at least one of these values, the output power is made to move in a stable direction.

In the solar power generating device of the fifth aspect of the present invention, at least one of the virtual optimum operating voltage and the control voltage range is reset by the resetting means on the basis of the output voltage of the solar cell, after the operation of the power conversion means has been stopped in accordance with the condition of the output power of the solar cell. Namely, when the temperature surrounding the periphery of the solar cell changes radically due to factors such as a change in the weather or the change between daytime and nighttime temperatures, the output voltage-output power characteristic of the solar cell accompanying this change changes radically and, in some cases, stable output power cannot be obtained in the MPPT control on the basis of the virtual optimum operating voltage and the control voltage range which were set immediately before the startup of the power conversion means. In these circumstances, by resetting at least one of the virtual optimum operating voltage and the control voltage range, on the basis of the output voltage of the solar cell after stopping the operation of the power conversion means, this type of problem can be solved.

In this way, according to the solar power generating device of the fourth and fifth aspects of the present invention, the virtual optimum operating voltage and the control voltage range used when the operating point of the solar cell is controlled so as to track the maximum power point of the solar cell are set on the basis of the output voltage of the solar cell immediately before the startup of the power conversion means. Therefore, the optimum virtual optimum operating voltage and control voltage range can be set in accordance with the amount of solar radiation and the temperature around the periphery of the solar cell and other such seasonal changes as well as the number of solar cell panels connected in series which are actually installed. In addition, in the solar power generating device of the fourth aspect of the present invention, because at least one of the virtual optimum operating voltage and the control voltage range, which were set, is increased by a predetermined amount when the output power from the solar cell was not stable, the output power can be stabilized and, during periods of low output power when the operation is generally unstable, constant voltage control is carried out to set the output voltage of the solar cell as a fixed voltage.

In the solar power generating device of the fifth aspect of the present invention, because at least one of the virtual optimum operating voltage and the control voltage range is reset after the operation of the power conversion means has been stopped in accordance with the condition of the output power of the solar cell on the basis of the output voltage of the solar cell, the output power can be stabilized and, during periods of low output power when the operation is generally unstable, constant voltage control is carried out to set the output voltage of the solar cell as a fixed voltage. Accordingly, in the solar power conversion device of the fourth and fifth aspects of the present invention, power can be generated in a stable operation from the time the output power is low until a high output power is achieved. As a result, the output power of the solar cell can be used efficiently.

In the solar power generating device of the sixth and seventh aspects of the present invention, according to the solar power generating device of the fourth and fifth aspects of the present invention, the setting means sets a determining reference voltage less than a lower limit of the control voltage range on the basis of the output voltage of the solar cell immediately before the startup of the power conversion means, and the resetting means decides that the output power of the solar cell is unstable when the output voltage of the solar cell is less than the determining reference voltage. In addition, the solar power generating device of the seventh aspect of the present invention carries out the resetting of at least one of the above-described virtual optimum operating voltage and the control voltage range.

According to the solar power generating device of the sixth and seventh aspects of the present invention, a determining reference voltage, which is less than the minimum value of the control voltage range, is set by the setting means in the fourth and fifth aspects of the present invention on the basis of the output voltage of the solar cell immediately before the startup of the power conversion means. When the output voltage of the solar cell is less than the determining reference voltage, then the resetting means decides that the output power of the solar cell is not stable.

Furthermore, in the solar power generating device of the seventh aspect of the present invention, at least one of the virtual optimum operating voltage and the control voltage range are reset.

In this way, according to the solar power generating device of the sixth and seventh aspects of the present invention, the same effects are achieved as in the solar power generating device of the fourth and fifth aspects of the present invention. In addition, because the determining reference voltage is set on the basis of the output voltage of the solar cell immediately before the startup of the power conversion means, the optimum determining reference voltage can be set in accordance with the amount of solar radiation and the temperature around the periphery of the solar cell and other such seasonal changes as well as the number of solar cell panels connected in series which are actually installed. Moreover, simply by comparing the output voltage of the solar cell with the determining reference voltage which was set in the above-described simple fashion, it can be decided whether or not the output power of the solar cell is stable or not. Thus simple and precise decision-making can be made.

In the solar power generating device of the eighth aspect of the present invention, according to the solar power generating device of the fourth through seventh aspects of the present invention, setting means sets the switching range, which is narrower than the control voltage range and which includes the virtual optimum operating voltage, on the basis of the output voltage of the solar cell immediately before the startup of the power conversion means, and control means changes the output voltage of the solar cell in stages and makes the width of the voltage change when the output voltage is a value inside the above-described switching range smaller than when the output voltage is a value outside the switching range.

According to the solar power generating device of the eighth aspect of the present invention, the setting means of the solar power generating device of the fourth through seventh aspects of the present invention sets the switching range, which is narrower than the above-described control voltage range and which includes the virtual optimum operating voltage, on the basis of the output voltage of the solar cell immediately before the startup of the power conversion means.

Then, every time the control means changes the output voltage of the solar cell in stages, the control means makes the width of the change smaller when the output voltage is a figure falling inside the above-described switching range than when the output voltage is a figure falling outside the above-described switching range.

In this way, according to the solar power generating device of the eighth aspect of the present invention, the same effects can be achieved as in the solar power generating device of the fourth through seventh aspects of the present invention. In addition, when the output voltage of the solar cell is a value inside the switching range which is adjacent to the virtual optimum operating voltage, the width of the voltage change is made smaller than when the output voltage of the solar cell is a value inside the switching range which is not adjacent to the virtual optimum operating voltage. Therefore, the operating point of the solar cell can be moved in a short time to the maximum power point. Moreover, because the above-described switching range is set on the basis of the output voltage of the solar cell immediately before the startup of the power conversion means, the optimum switching range can be set in accordance with the amount of solar radiation and the temperature around the periphery of the solar cell and other such seasonal changes as well as the number of solar cell panels connected in series which are actually installed.

BRIEF DESCRIPTION OF THE DRAWINGS

FIG. 3 B is a flow chart showing the operation of the solar power generating device of the second embodiment of the present invention.

FIG. 4 B is a graph showing the output voltage-output power characteristic of a solar cell used in to explain the maximum power tracking control.

FIG. 6 B is a flow chart showing the operation of a solar power generating device of the third embodiment of the present invention.

DESCRIPTION OF THE PREFERRED EMBODIMENTS

Figure 1:
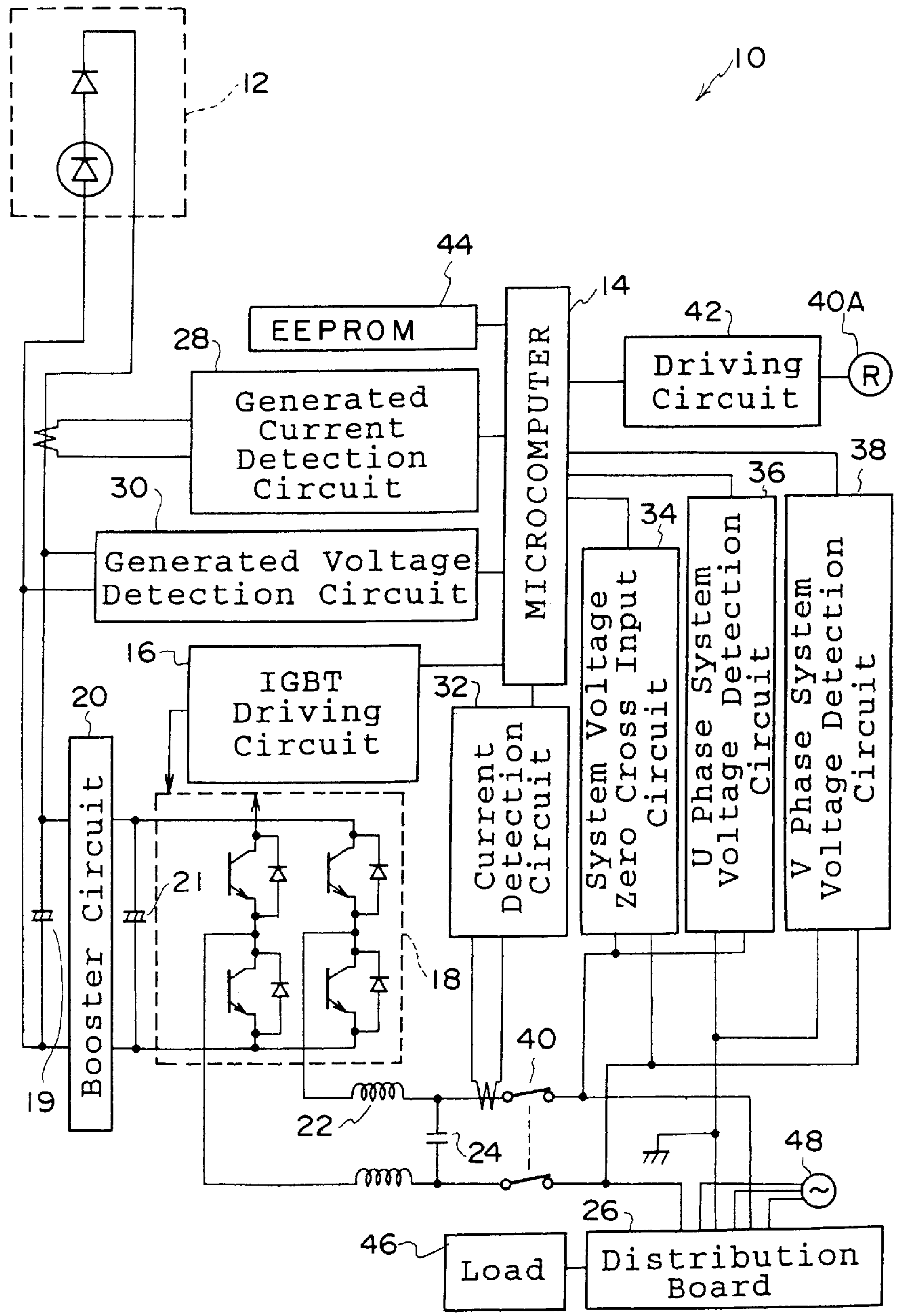
FIG. 1 is a block view showing a schematic structural view of the solar power generating device of each embodiment of the present invention.

A detailed description, with reference to the drawings, will now be given of the solar power generating device according to an embodiment of the present invention First Embodiment FIG. 1 is a block view showing the overall structure when the solar power generating device of the present invention is applied as a system interconnection system for providing power to the load when connected to a commercial power system. As is shown in FIG. 1, a microcomputer 14 is provided in the solar power generating device 10 according to the present embodiment. An inverter circuit 18 is connected to the microcomputer 14 via an IGBT driving circuit 16.

Electric power (DC power) generated by the solar panel 12 constructed of solar cells is supplied to the inverter circuit 18 via a condenser 19, a booster circuit 20, and a condenser 21. The solar panel 12 which absorbs sunlight has several modules thereof set in a frame, for example, and is disposed in a location such as the roof of a building which receives solar radiation. It should be noted here that the microcomputer 14 corresponds to the setting means and the control means of the present invention, and the inverter circuit 18 and the booster circuit 20 correspond to the power conversion means of the present invention.

The inverter circuit 18 performs the function of converting the DC power supplied from the solar panel 12 via the condenser 19, the booster circuit 20, and the condenser 21 into AC power, based on PMW theory, having the same frequency as commercial power (for example, 50 or 60 hertz) on the basis of the switching signal supplied from the IGBT driving circuit 16 controlled by the microcomputer 14.

The power converted into AC power by the inverter circuit 18 is supplied to a distribution board 26 via a choke transformer 22 and a condenser 24, and is then output from the distribution board 26 into a commercial power system 48 in the shape of commercial power. At this time, the AC power output from the inverter circuit 18 is made to be output in the form of a sine wave by passing through the choke transformer 22 and the condenser 24. It should be noted that a load 46 is connected to the distribution board 26, and the load 46 operates using one of either the power supplied from the solar power generating device 19 or the power supplied from the commercial power system 48.

The microcomputer 14 has a generated current detection circuit 28, a generated voltage detection circuit 30, a current detection circuit 32, a system voltage zero cross input circuit 34, a U phase voltage detection circuit (U phase system voltage detection circuit) 36, and a V phase voltage detection circuit (V phase system voltage detection circuit) 38 connected thereto.

The microcomputer 14 detects commercial power voltage and phasing by the zero cross input circuit 34 and the U and V phase voltage detection circuits 36 and 38 and based on the detection results controls the IGBT driving circuit 16, and generates a switching signal to cause the phasing and frequency of the output power from the inverter circuit 18 to match up with the commercial power source.

At the same time as this, the microcomputer 14 calculates the output power and amount of change in the power (power variation) of the solar panel 12 on the basis of the output current and output voltage from the solar panel 12 detected respectively by the generated current detection circuit 28 and the generated voltage detection circuit 30. On the basis of this calculation, the microcomputer 14 controls the MPPT control.

The microcomputer also determines whether or not the commercial power has been cut and, if the power has been cut, opens the connection point of the system conductor 40 provided on the condenser 24 on the side closer to the distribution board 26 so that the inverter circuit is cut off (paralleled off) from the commercial power supply. At this time, the switching operation of the inverter circuit 18 is also stopped. Namely, when the microcomputer 14 detects that the commercial power supply has been cut, it drives the relay coil 40A of the system conductor 40 via the driving circuit 42.

Further, the microcomputer 14 measures the output power from the detection results of the current detection circuit 32

An EEPROM 44 is also connected to the microcomputer 14. In the EEPROM 44 are stored a parameter of an unillustrated system interconnection protection device, an operating data indicating the operating state of the solar power generating device 10, and the like. The microcomputer 14 controls the operations of the various pieces of equipment on the basis of the data stored in the EEPROM 44. Data is able to be electrically read from and written into the EEPROM, and necessary data at the startup time of the solar power generating device is read from the EEPROM 44 by the microcomputer and where necessary data is also written to the EEPROM 44 during the operation of the solar power generating device 10.

Figure 2:
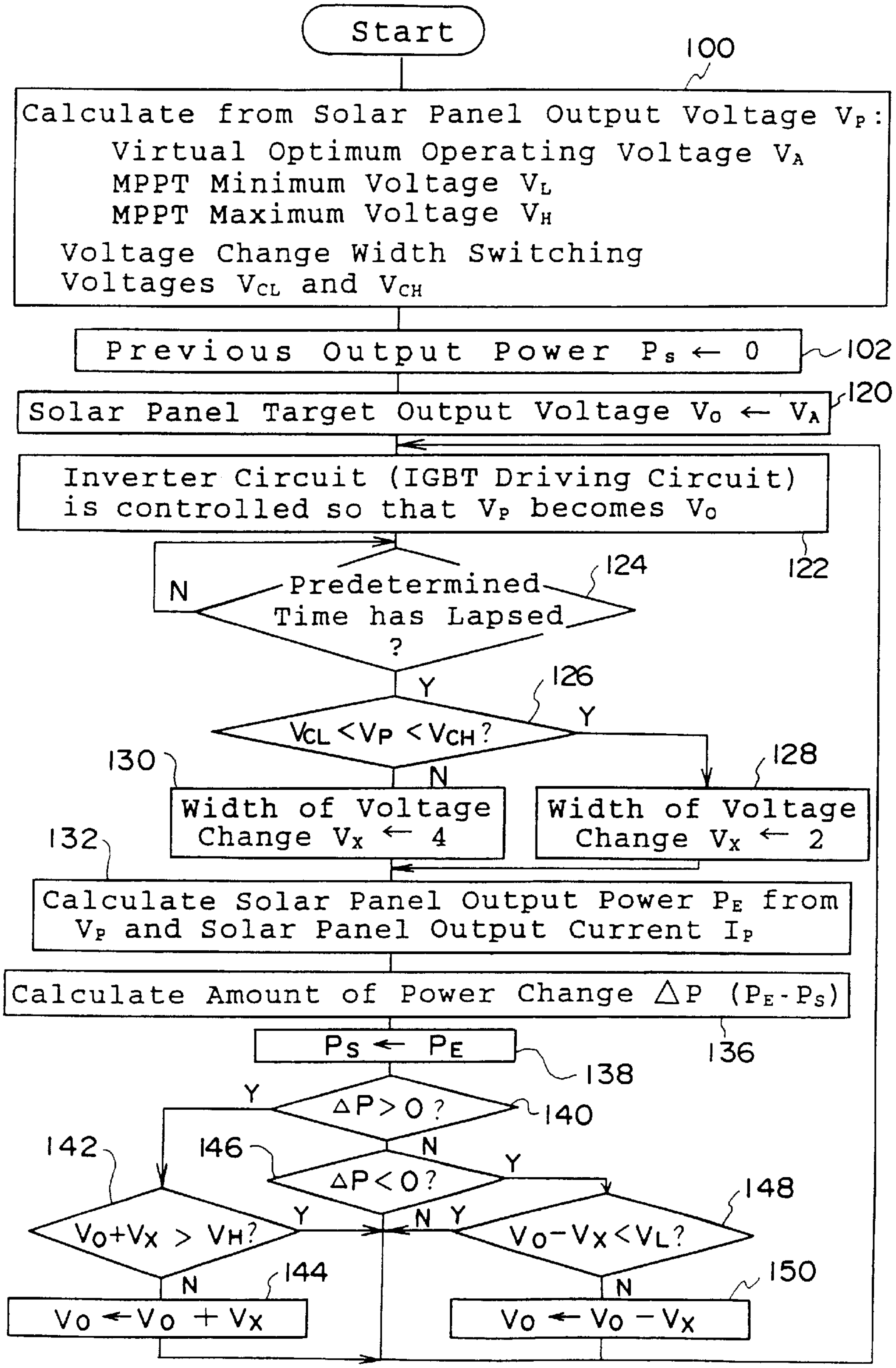
FIG. 2 is a flow chart showing the operation of the solar power generating device of the first embodiment of the present invention.

Next, the operation during MPPT control of the solar power generating device 10, which is constructed as described above, will be explained with reference to FIG. 2. It should be noted that FIG. 2 is a flow chart showing the flow of the control program executed in the microcomputer 14 during MPPT control.

Firstly, in step 100, on the basis of the output voltage $V_P$ from the solar panel 12 input from the generated voltage detection circuit 30, the following calculations 1 through 5 are made. The calculations allow: the virtual optimum operating voltage $V_A$; the MPPT minimum voltage $V_L$; the MPPT maximum voltage $V_H$; the low voltage change width switching voltage $V_{CL}$ which is lower than the virtual optimum operating voltage $V_A$; and the high voltage change width switching voltage $V_{CH}$ which is higher than the virtual optimum operating voltage $V_A$ to be calculated.

$$V_A = V_P \times 0.80 \quad (1)$$

$$V_L = V_P \times 0.70 \quad (2)$$

$$V_H = V_P \times 0.90 \quad (3)$$

$$V_{CL} = V_P \times 0.75 \quad (4)$$

$$V_{CH} = V_P \times 0.85 \quad (5)$$

The constants in each of the above formulas (0.80, 0.70, 0.90, 0.75, 0.85) are values set in accordance with the type and so forth of solar cell used and the present invention is not limited to these values. The range from the above-described MPPT minimum voltage $V_L$ to the MPPT maximum voltage $V_H$ corresponds to the control voltage range of the present invention, while the range from the low voltage change width switching voltage $V_{CL}$ to the high voltage change width switching voltage $V_{CH}$ corresponds to the switching range of the present invention.

In the next step 102, the value of the output power $P_S$, output the previous time from the solar panel 12, is set at zero, and in the next step 120, the virtual optimum operating voltage $V_A$, calculated in the above-described step 100, is set as the target output voltage $V_O$ of the solar panel 12. In the next step 122, ON duty of the inverter circuit 18 (the IGBT driving circuit 16) is controlled so that the output voltage $V_P$ of the solar panel 12 becomes the target output voltage $V_O$.

In the next step 124, a predetermined period of time is allowed to elapse (approximately 2–4 seconds in the present embodiment) and then, in the next step 126, it is determined whether or not the output voltage $V_P$ of the solar panel 12 is larger than the low voltage change width switching voltage $V_{CL}$ or less than the high voltage change width switching voltage $V_{CH}$. If the determination is affirmative, then the process moves to step 128 and 2 is substituted for the voltage change width $V_X$ and the process then moves to step 132. On the other hand, if the determination in step 126 is negative, the process moves to step 130 and 4 is substituted for the voltage change width and the process then moves to step 132.

In step 132, the output power $P_E$ of the solar panel 12 is calculated from the output voltage $V_P$ and the output current $I_P$ of the solar panel 12. In the next step 136, the amount of the power change $\Delta P$ is calculated by subtracting the value of the previous output power $P_S$ from the value of the output power $P_E$. In the next step 138, the value of the output power $P_E$ calculated in step 132 is set as the value of the previous output power $P_S$.

In the next step 140, it is determined whether or not the amount of the power change $\Delta P$ is greater than 0. If it is greater than 0, the process moves to step 142 where the voltage change width $V_X$ is added to the target output voltage $V_O$ and it is determined whether or not the resulting value is larger than the MPPT maximum voltage $V_H$. If the resulting value is not larger than the MPPT maximum voltage $V_H$, then in step 144 the target output voltage $V_O$ is increased by the voltage change width $V_X$ and the process returns to step 122. On the other hand, if it is determined in step 142 that the sum of the target output voltage $V_O$ and the voltage change width $V_X$ is larger than the MPPT maximum voltage $V_H$, then the process returns to step 122 without executing step 144. Namely, in steps 140 through 144, when the amount of the power change $\Delta P$ is on an increasing trend, the target output voltage $V_O$ is increased by the voltage increase width $V_X$, with the MPPT maximum voltage $V_H$ as the upper limit, in order to increase the output power even further.

On the other hand, if it is determined in step 140 that the amount of the power change ΔP is not greater than 0, then the process moves to step 146 and it is determined whether or not the amount of the power change is less than 0. If it is determined that it is not less than 0, namely, if it is determined that the amount of the power change is 0, then the process returns to step 122 without the target output voltage $V_O$ being changed. If it is determined that the amount of the power change ΔP is less than 0, the process moves to step 148 and it is determined whether or not the result when the voltage change width $V_X$ is subtracted from the target output voltage $V_O$ is smaller or not than the MPPT minimum voltage $V_L$. If it is not smaller, then in step 150, the voltage change width $V_X$ is subtracted from the target output voltage $V_O$ and the process then returns to step 122.

On the other hand, if it is determined in step 148 that the resulting value when the voltage change width $V_X$ is subtracted from the target output voltage $V_O$ is less than the MPPT minimum voltage $V_L$, the process returns to step 122 without executing step 150. Namely, in steps 146 through 150, when the amount of the power change ΔP is on a decreasing trend, the target output voltage $V_O$ is decreased by the voltage change width $V_X$, with the MPPT minimum voltage $V_L$ as the lower limit, in order to increase the output power in reverse.

After this, by repeating the processes from step 122 through step 150 as described above, MPPT control can be carried out in a range between the MPPT minimum voltage $V_L$ and the MPPT maximum voltage $V_H$.

In this way, in the solar power generating device according to the first embodiment of the present invention, each time MPPT control is carried out, the virtual optimum operating voltage $V_A$, the MPPT minimum voltage $V_L$, and the MPPT maximum voltage $V_H$ are calculated on the basis of the output voltage $V_P$ of the solar panel 12 immediately before the startup of the inverter circuit 18. Therefore, the MPPT control can be carried out in the optimum range in accordance with the temperature surrounding the periphery of the solar panel 12 and other seasonal variations, and as a result, the output power from the solar panel 12 can be used efficiently.

Moreover, in the solar power generating device according to the first embodiment of the present invention, the low and high voltage change width switching voltages $V_{CL}$ and $V_{CH}$ are used and when the output voltage $V_P$ of the solar panel 12 is either a value lower than $V_{CL}$ or a value higher than $V_{CH}$, the voltage change width is increased. When the output voltage $V_P$ of the solar panel 12 is inside the range from $V_{CL}$ to $V_{CH}$ which is adjacent to the virtual optimum operating voltage $V_A$, the width of the voltage change is made less than when the output voltage $V_P$ of the solar panel 12 is outside the range from $V_{CL}$ to $V_{CH}$. Therefore, the operating point of the solar panel 12 can be moved to the maximum power point in a short time.

In addition, in the solar power generating device according to the first embodiment of the present invention, the low and high voltage change width switching voltages $V_{CL}$ and $V_{CH}$ are calculated on the basis of the output voltage $V_P$ of the solar panel 12 immediately before startup of the inverter circuit 18, the optimum low and high voltage change width switching voltages $V_{CL}$ and $V_{CH}$ can be set in accordance with the temperature surrounding the periphery of the solar panel 12 and other seasonal variations Second Embodiment The above-described first embodiment described an embodiment in which the solar power generating device conducted only the MPPT control. The second embodiment of the present invention conducts constant voltage control when the output power from the solar panel 12 is low relative to the solar power generating device 10 according to the first embodiment of the present invention. Accordingly, the microcomputer 14 in the second embodiment (refer to FIG. 1) is provided with two control modes, namely an MPPT control mode (tracking control mode) and a constant voltage control mode. It should be noted that the solar power generating device of the second embodiment of the present invention is structured in the same way as the solar power generating device 10 of the first embodiment of the present invention, accordingly, a description thereof is omitted.

Figure 3A:
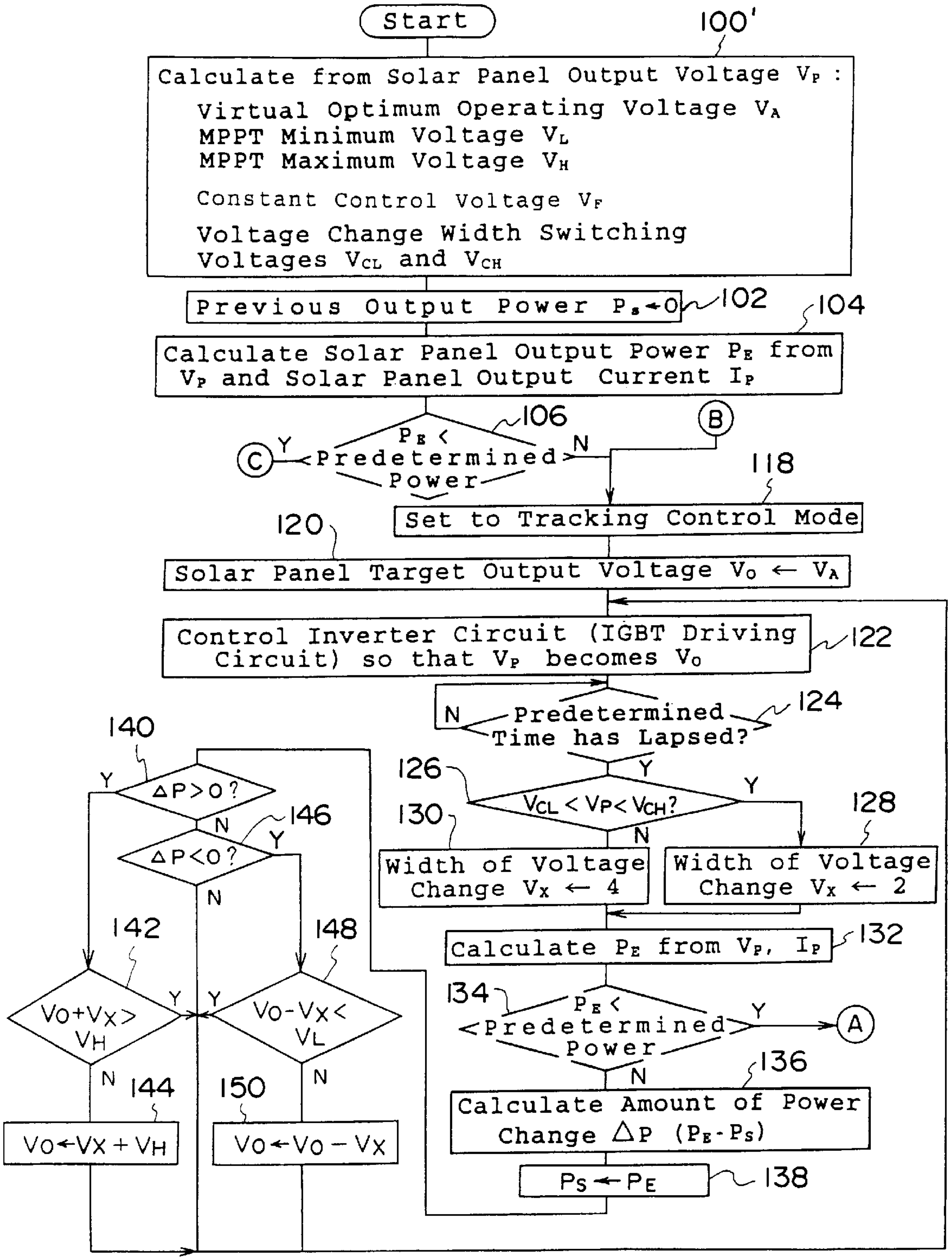
FIG. 3 A is a flow chart showing the operation of the solar power generating device of the second embodiment of the present invention.
Figure 3B:
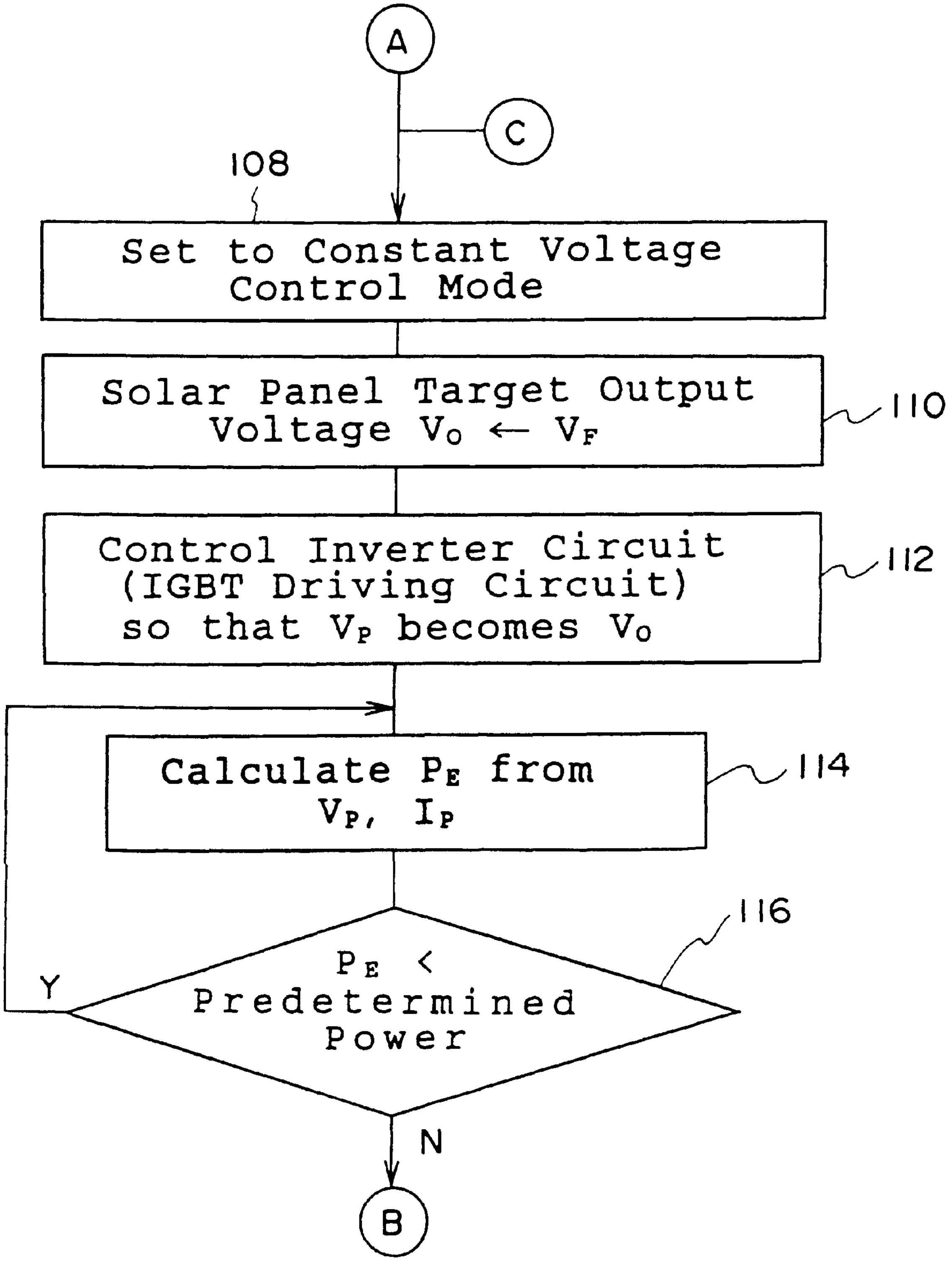

Next, the operation of the solar power generating device according to the second embodiment of the present invention will be explained with reference to FIG. 3. FIG. 3 is a flow chart showing the flow of a control program executed by the microcomputer 14, and where the flow chart is the same as that in FIG. 2, the same symbols are used and an explanation thereof is omitted.

Firstly, in step 100', on the basis of the output voltage $V_P$ of the solar panel 12 from the generated voltage detection circuit 30, the following are calculated using the above-described formulae 1 through 5 as well as formula 6 below: the virtual optimum operating voltage $V_A$; the MPPT minimum voltage $V_L$; the MPPT maximum voltage $V_H$; the low voltage change width switching voltage $V_{CL}$ which has a lower voltage than the virtual optimum operating voltage $V_A$; and the high voltage change width switching voltage $V_{CH}$ which has a virtual optimum operating voltage $V_A$; and the constant control voltage $V_F$.

$$V_F = V_P \times 0.80 \tag{6}$$

It should be noted that the constant (0.80) in the above formula 6 is a value set in accordance with the type, and the like, of solar power generating device being used, in the same way as for the above-described formulae, and the present invention is not limited to this value. It should also be noted that the above-described constant control voltage $V_F$ corresponds to the fixed voltage of the present invention.

Thereafter, step 102 is executed, and in the next step 104, the output power $P_E(=V_P \times I_P)$ of the solar panel 12 is calculated from the output voltage $V_P$ and the output current $I_P$ from the solar panel 12. In the next step 106, the determination is made as to whether or not the output power $P_E$ is less than a predetermined amount (for example, 1 kW), and if the output power PE is less than the process moves to step 108, where the constant voltage control mode is set. The constant voltage control mode of step 108 corresponds to the second mode of the present invention.

In the next step 110, the constant control voltage $V_F$, calculated in the above-described step 100', is set as the target output voltage $V_O$ of the solar panel 12. Consequently, in the next step 112, the ON duty of the inverter circuit 18 (IGBT driving circuit 16) is controlled so that the output voltage $V_P$ of the solar panel 12 becomes the target output voltage $V_O$.

In the next step 114, the output power $P_E$ of the solar panel 12 is calculated from the output voltage $V_P$ and output current $I_P$ of the solar panel 12 in the same way as in the above-described step 104. In the next step 116, it is determined whether or not the output power $P_E$ is less than the above-described predetermined power amount. If the output power $P_E$ is less than the predetermined power amount, then the process returns to step 114. If the output power $P_E$ is not less than the predetermined power amount, then the process moves to step 118 mentioned below. Namely, constant voltage control is carried out through the determining process of step 116 until the output power of the solar panel $P_E$ is more than or equal to the predetermined power amount.

On the other hand, if, as a result of the determination made in the above-described step 106, it is determined that the output power $P_E$ is not less than the predetermined power amount, the process moves to step 118, where the tracking mode is set. This tracking mode corresponds to the first mode of the present invention.

After this, after the processes of steps 120 through 132 have been carried out, in the following step 134, it is determined whether or not the output power $P_E$ of the solar panel 12 is less than the above-described predetermined power amount. If the output power $P_E$ is less than the predetermined power amount, then the process moves to step 108 and the aforementioned constant voltage control mode is executed. If the output power $P_E$ is not less than the predetermined power amount, then the process moves to step 136 and the processes of steps 136 through 150 are subsequently carried out in the same way as in the above-described first embodiment.

In this way, in the solar power generating device 10 of the second embodiment of the present invention, the same effects as in the above-described first embodiment can be achieved. At the same time, because constant voltage control is obtained when the output power is low which causes unstable operation, power can be generated in a stable operation from the time the output power is low until a high output power is achieved.

The explanation given in each of the above embodiments was for the case when the voltage variable width $V_X$ during MPPT control is taken as 2 [V] when the output voltage $V_P$ of the solar panel 12 is inside the range between the voltage change width switching voltage $V_{CL}$ to the voltage change width switching voltage $V_{CH}$, and for the case when the voltage variable width $V_X$ during MPPT control is taken as 4 [V] when the output voltage VP of the solar panel 12 is outside the range between the voltage change width switching voltage $V_{CL}$ to the voltage change width switching voltage $V_{CH}$, however, the present invention is not limited to this and the values of these voltage change widths may be appropriately changed in accordance with factors such as the environment surrounding the location of the solar panel 12 and the like.

Further, the explanation given in each of the above embodiments was for the case when the voltages, such as the virtual optimum operating voltage $V_A$ calculated immediately before the startup of the inverter circuit 18, were calculated by multiplying a constant by the output voltage $V_P$ of the inverter circuit 18, however, the present invention is not limited to this and the voltages may be calculated by, for example, subtracting a predetermined value from the output voltage $V_P$ of the inverter circuit 18.

Third Embodiment

The third embodiment of the present invention executes a control in order to solve the problem of unstable operation in cases when the operation of the solar power generating device 10 is unstable while in the constant voltage control mode of the above-described second embodiment. It should be noted that the structure of the solar power generating device of the third embodiment is substantially the same as the solar power generating device 10 of the first and second embodiments (refer to FIG. 1), however, the microcomputer 14 corresponds to the setting means and the control means of the present invention, and also to the resetting means of the present embodiment.

Figure 6A:
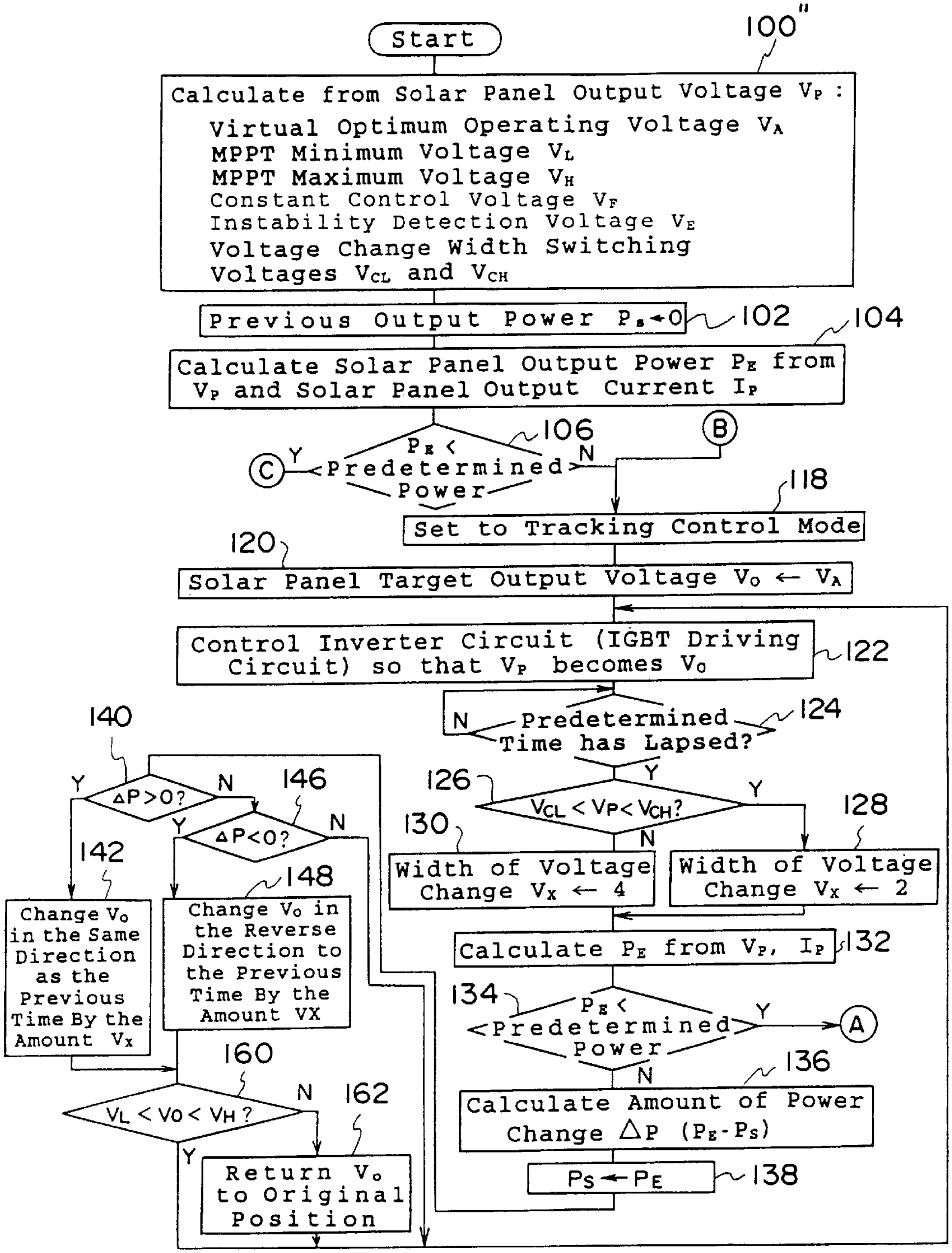
FIG. 6 A is a flow chart showing the operation of a solar power generating device of the third embodiment of the present invention.
Figure 6B:
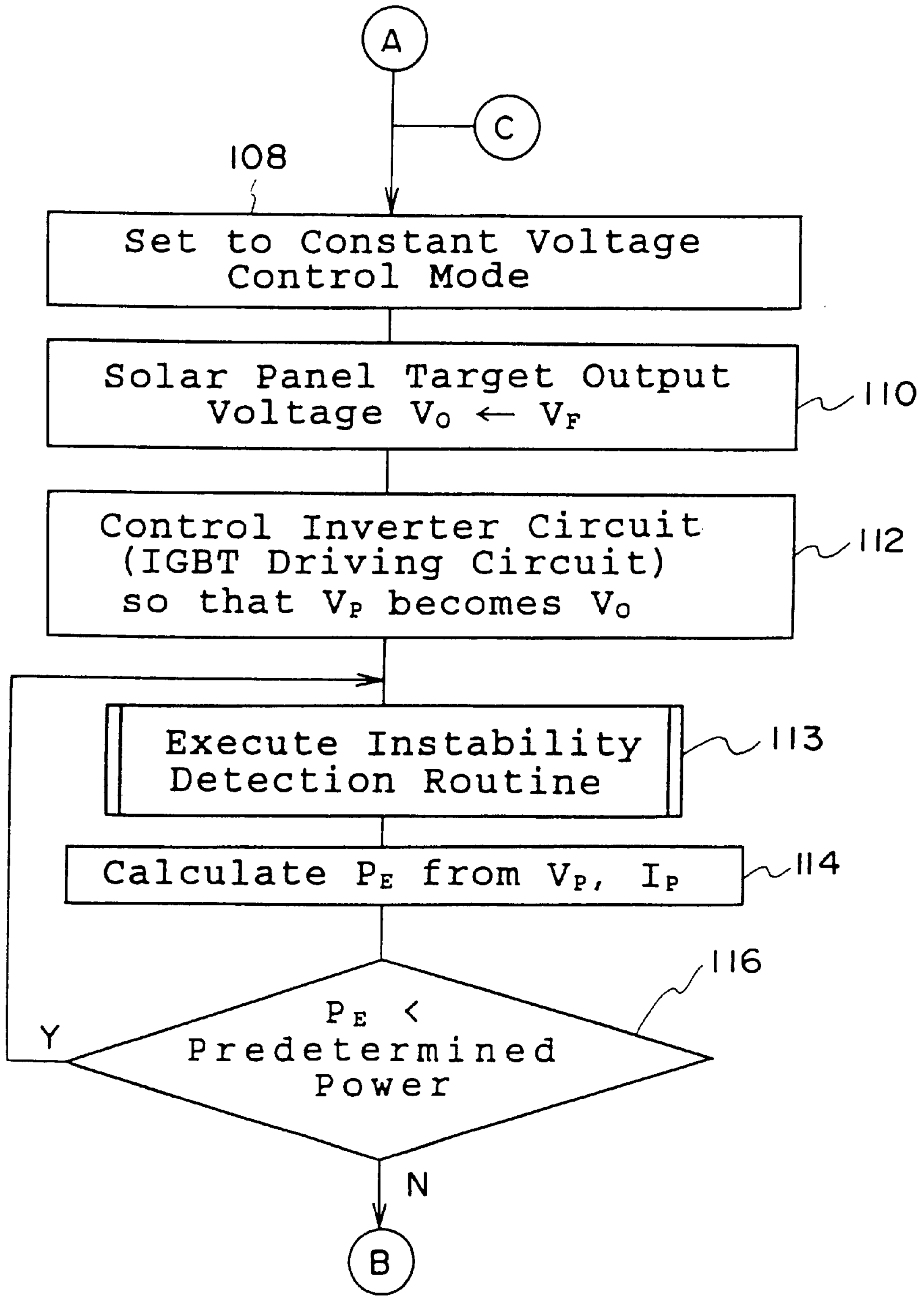

Next, the operation of the solar power generating device 10 according to the third aspect of the present invention will be described with reference to FIG. 6. It should be noted that FIG. 6 is a flow chart showing the flow of the control program executed in the microcomputer 14.

Firstly, in step 100", on the basis of the output voltage $V_P$ of the solar panel 12 input from the generated voltage detection circuit 30, the above described formulae 1 through 6 and the following formula 7 are used to calculate: the virtual optimum operating voltage $V_A$; the MPPT minimum voltage $V_L$; the MPPT maximum voltage $V_H$; the constant control voltage $V_F$; the instability detection voltage $V_E$; the low voltage change width switching voltage $V_{CL}$ which has a voltage lower than the virtual optimum operating voltage $V_A$; and the high voltage change width switching voltage $V_{CH}$ which has a voltage higher than the virtual optimum operating voltage $V_A$.

$$V_E = V_P \times 0.60 \tag{7}$$

It should be noted that the constant (0.60) in the above formula (7) is a value set in accordance with the type of solar cell being used etc. and the present invention is not limited by such values. The above-mentioned instability detection voltage $V_E$ corresponds to the determining reference voltage of the present invention.

After that the process moves to steps 102, 104, and 106 in the same way as in the second embodiment of the present invention, and in step 106, it is determined whether or not the output power $P_E$ is less than a predetermined power amount (for example, 1 kW) and, if the output power $P_E$ is less than the predetermined power amount, the process moves to step 108 and the constant voltage control mode is set.

Figure 7:
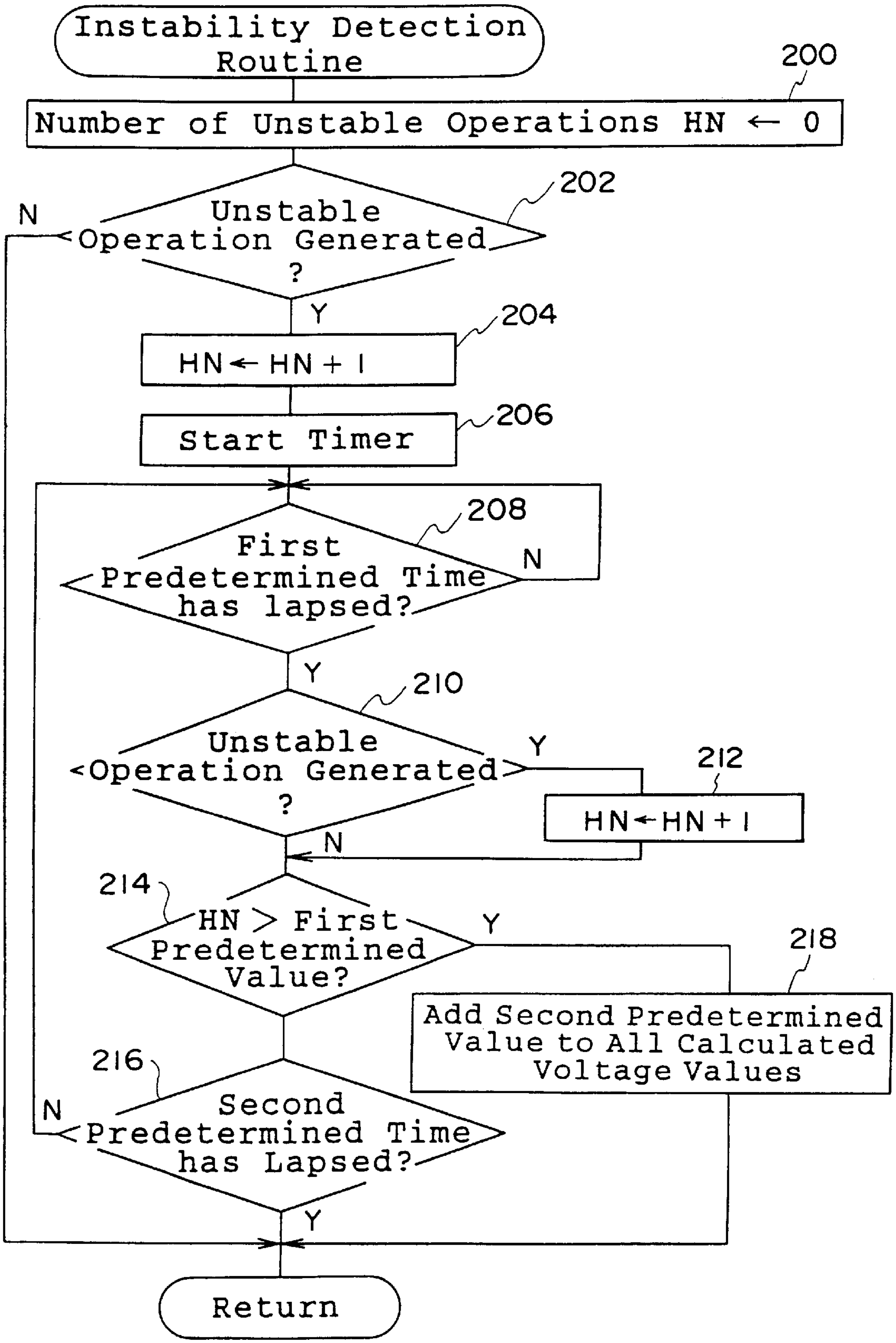
FIG. 7 is a flow chart showing the flow of an instability detection routine in the flow chart in FIG. 6.

Next, steps 110 and 112 are executed in the same way as in the second embodiment of the present invention, and in the following step 113, the instability detection routine shown in FIG. 7 is executed to detect whether or not the solar power generating device is performing unstable operations.

Figure 4A:
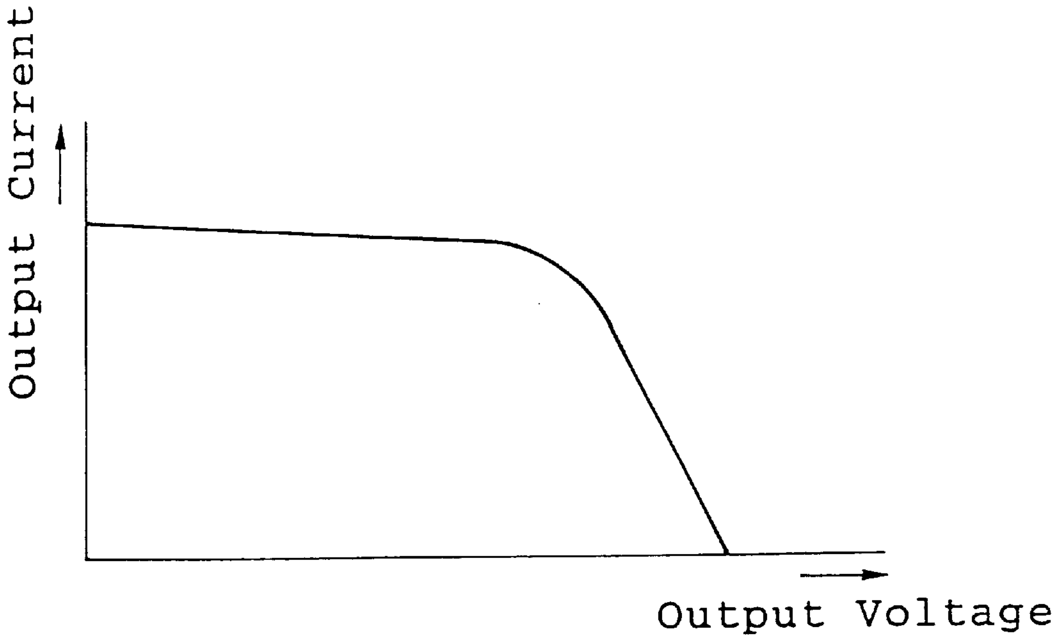
FIG. 4 A is a graph showing the output voltage-output current characteristic of a solar cell.
Figure 4B:
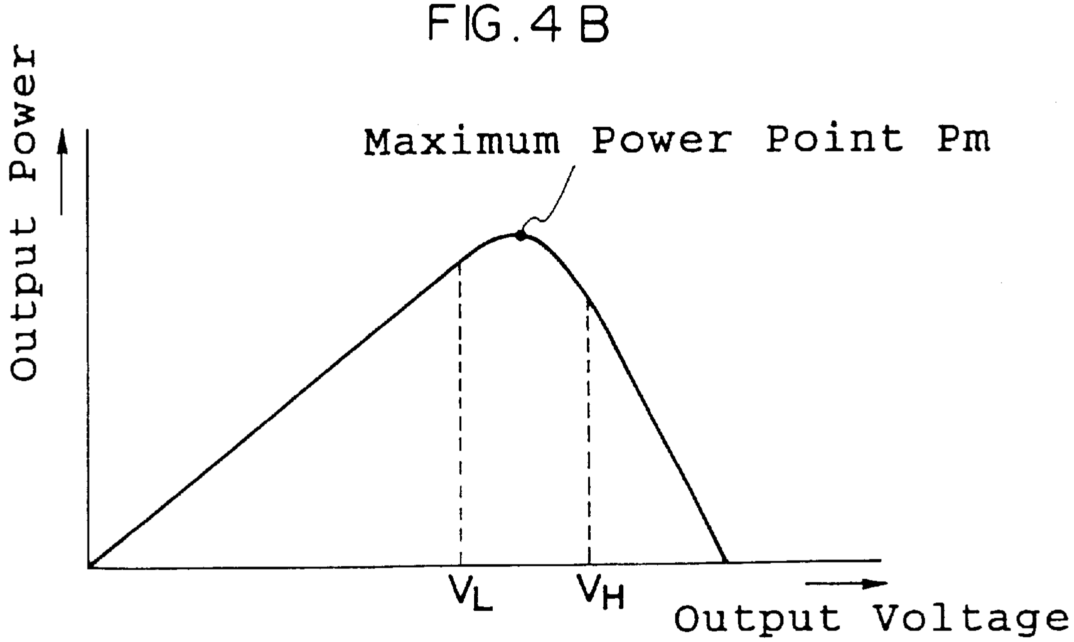
Figure 5:
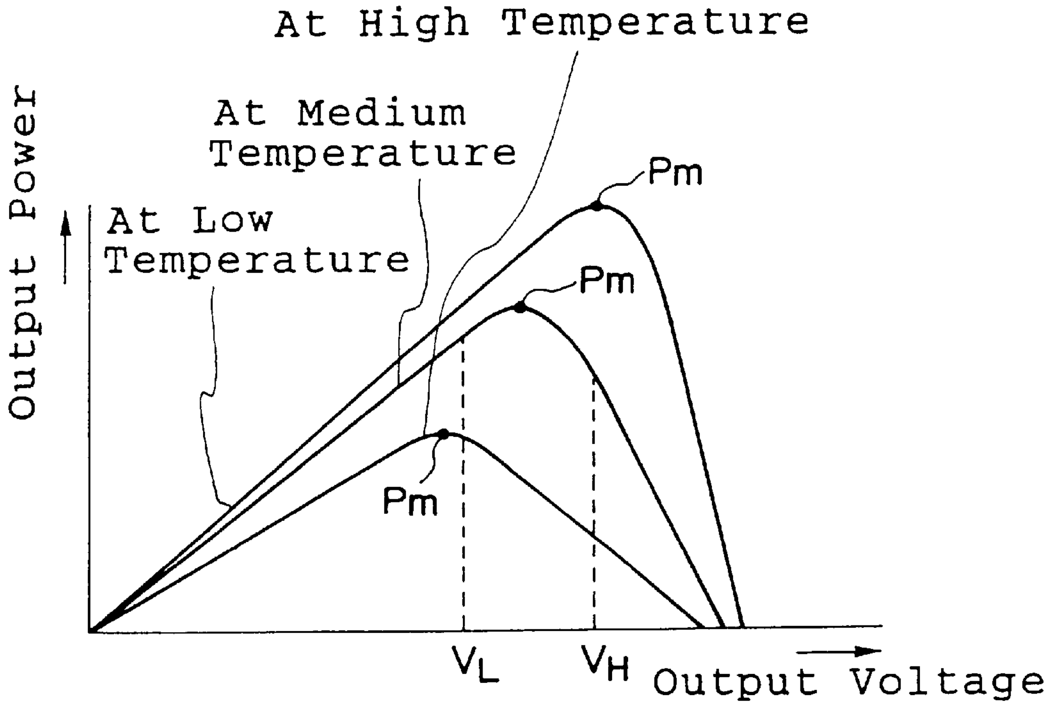
FIG. 5 is a graph showing the output voltage-output power characteristic of a solar cell when the temperature around the periphery of the solar cell is taken as a parameter.

In step 200 of the instability detection routine, the initial setting of the number of unstable operations HN is set to zero. In the next step 202, a determining process is carried out to determine whether or not unstable operations are occurring. The determination on the unstable operations at this time is based on whether or not the output voltage $V_P$ of the solar panel 12 input from the generated voltage detection circuit 30 is lower than the instability detection voltage $V_E$ calculated in the above-described step 100. Namely, as was shown in FIG. 4 A, because the output voltage $V_P$ becomes less than the optimum operating point, the operation of the solar cell becomes more unstable (the output voltage $V_P$ changes easily), it is determined that unstable operations are occurring when the output voltage $V_P$ is less than the instability detection voltage $V_E$.

If it is determined that unstable operations are not occurring as a result of the determination in step 202, no process is executed and the instability detection routine terminates.

On the other hand, if it is determined that unstable operations are occurring as a result of the determination in step 202, the process moves to step 204 and the number of unstable operations HN is increased by 1. In the next step 206, an unillustrated timer built into the microcomputer 14 is started.

In the next step 208, a first predetermined time is allowed to pass (5 seconds in the present embodiment), and in the next step 210, it is determined whether or not unstable operations are occurring using the same method as in the above-described step 202. If the determination is affirmative, the process moves to step 212 and the number of unstable operations HN is increased by one, then the process moves to step 214. If the determination is negative, no processing is executed and the process moves to step 214.

In step 214, it is determined whether or not the number of unstable operations HN is greater than a first predetermined value (5 in the present embodiment). If the determination is negative, the process moves to step 216 where it is determined whether or not the time recorded by the timer which was started in step 206 has surpassed a second predetermined time (50 seconds in the present embodiment). If the timer has not surpassed this time, the process returns to step 208. If the timer has surpassed this time, the instability detection routine is terminated.

On the other hand, if as a result of the determination in step 214, it is determined that the number of unstable operations HN is larger than the above-described first predetermined value, the process moves to step 218 and, after the second predetermined value (4 in the present embodiment) has been added onto all of the voltage values calculated in the above-described step 100", the instability detection routine is terminated.

Figure 8:
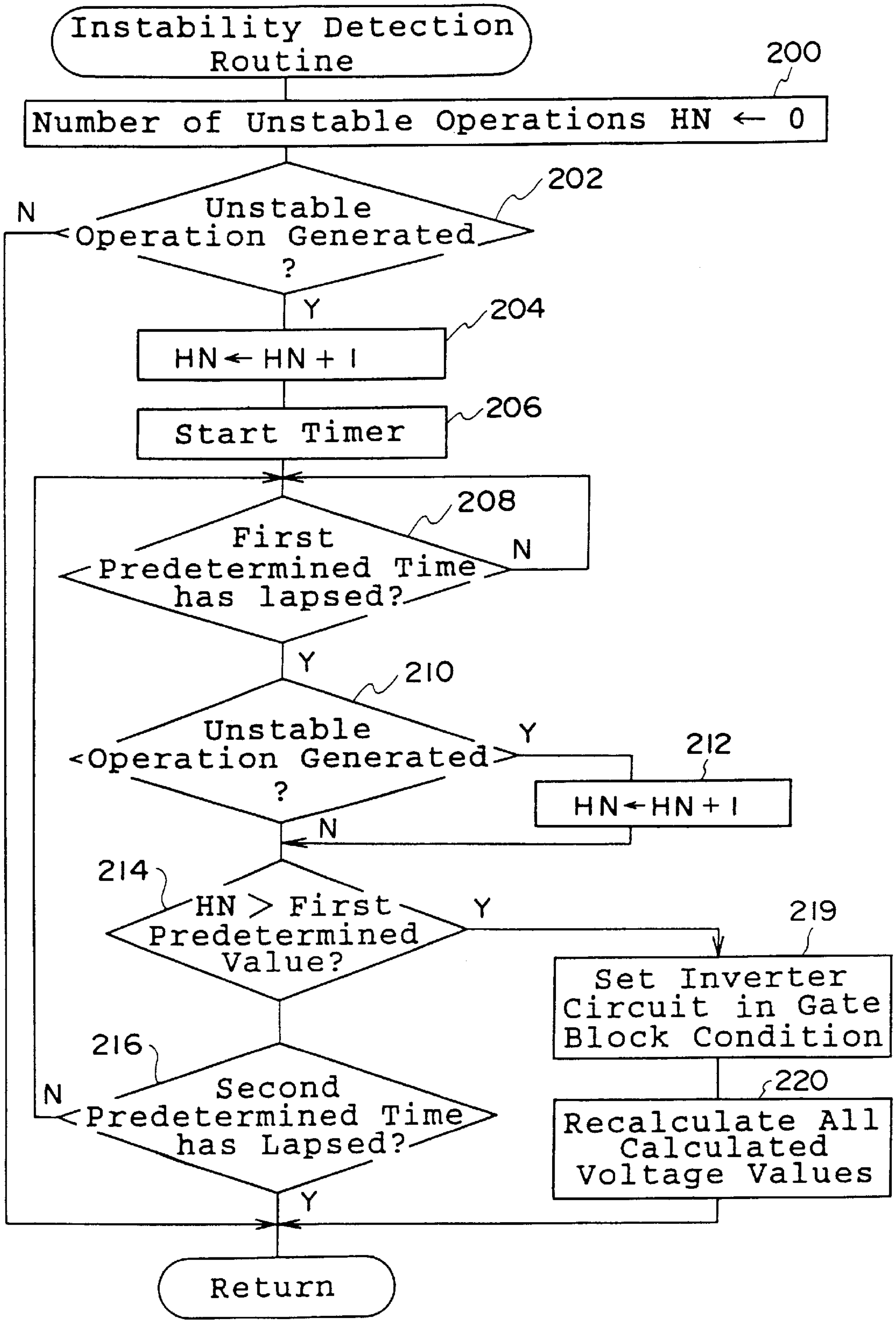
FIG. 8 is a flow chart showing the flow of an instability detection routine in another embodiment in the flow chart in FIG. 6.

If it is determined as a result of the determination made in step 214 that the number of unstable operations is greater than the above-described first predetermined value, as in the instability detection routine in another embodiment shown in FIG. 8, the process moves to step 219 and the inverter circuit 18 is put in a gate block condition (with the operations of the inverter circuit having been stopped). Then in step 220, all the voltage values calculated in the above-described step 100" (refer to FIG. 6) are recalculated and the instability detection routine is terminated.

In this instability detection, when an unstable operation is generated, during the period from that point until the above-described second predetermined time has passed, the number of unstable operations are counted only when the unstable operations reoccur at intervals of the above-described first predetermined time period. Accordingly, when the unstable operations occur singly at time intervals which are longer than the above-described second predetermined time, the value of the number of unstable operations HN is not counted up to more than 2.

When an instability operation routine is terminated as described above, in the same way as in the second embodiment of the present invention the process moves to the next steps 114 and 116 (refer to FIG. 6), where if the output power $P_E$ is less than the above-described predetermined power amount, the process returns to 113. If the output power $P_E$ is not less than the above-described predetermined power amount, the process moves to step 118. Namely, the constant voltage control is carried out while the instability detection routine mentioned above is repeatedly executed through the determining process in step 116, until the output power $P_E$ of the solar panel 12 is more than or equal to the predetermined power amount. n the other hand, if it is determined as a result of the determination made in the above-described step 106 that the output power $P_E$ is not less than the predetermined power amount, the process moves to step 118, where the tracking control mode (MPPT control mode) is set. After this, steps 118 through 150 (refer to FIG. 3) are executed in the same way as in the second embodiment of the present invention. Alternatively, as is shown in FIG. 6, the processes after step 140 may be carried out as described below.

Namely, in step 140, the determination is made as to whether or not the amount of the power change ΔP is greater than 0, and if the determination is affirmative, the process moves to step 142 where the target output voltage $V_O$ is moved in the same direction as the previous time by the amount of the voltage change width $V_X$ (either increase or decrease), then the process moves to step 160.

On the other hand, if the determination made in step 140 is negative as to whether or not the amount of power change ΔP is greater than 0, the process moves to step 146 where it is determined whether or not the amount of the power change ΔP is less than 0. If the determination is affirmative, the process moves to step 148 where the target output voltage $V_O$ is moved in the reverse direction to the previous time by the amount of the voltage change width $V_X$ (either increase or decrease), then the process moves to step 160. It should be noted that when the above-described steps 142 and 148 are executed for the first time, the target power voltage VO can be moved in either a direction of increase or in a direction of decrease.

In step 160, it is determined whether or not the target output voltage $V_O$ is greater than the MPPT minimum voltage $V_L$ and less than the MPPT maximum voltage $V_H$. If the determination is negative, then in step 162, the target output voltage $V_O$ is changed back to its original value (the value before steps 142 and 148 were carried out) and the process then returns to step 122. If the determination is affirmative, the process returns to step 122 without carrying out the process of step 162.

On the other hand, if it is determined in step 146 that the amount of the power change ΔP is not less than 0, namely that the amount of the power change ΔP is 0, the process moves to step 122 without changing the target output voltage $V_O$.

Namely, in steps 140 through 162, when the amount of the power change ΔP is on an increasing trend, the target output voltage $V_O$ is moved by the amount of the voltage change width $V_X$ in the same direction as the previous time in order to increase the output power $P_E$ even further, with the MPPT minimum voltage $V_L$ set as the lower limit and the MPPT maximum voltage $V_H$ set as the upper limit. If the amount of the power change ΔP is on a decreasing trend, the target output voltage $V_O$ is moved by the amount of the voltage change width $V_X$ in the reverse direction as the previous time in order to increase the output power $P_E$, with the MPPT minimum voltage $V_L$ set as the lower limit and the MPPT maximum voltage $V_H$ set as the upper limit. If the amount of the power change ΔP is 0, then the operating point is regarded as being identical to the maximum power point and no change is made to the target output voltage $V_O$.

After this, by repeating the above-described steps 122 through 162, MPPT control is carried out in the range between the MPPT minimum voltage $V_L$ and the MPPT maximum voltage $V_H$ and when the output power $P_E$ of the solar panel 12 is less than the above-described predetermined power amount, the constant voltage control mode is set.

In this way, in the solar power generating device according to the present embodiment, the same effects as in the above-described first and second embodiments of the present invention can be achieved. Moreover, because during unstable operation the values of the virtual optimum operating voltage $V_A$, the MPPT minimum voltage $V_L$, and the MPPT maximum voltage and the like are increased by the second predetermined value (4 in the present embodiment), any unstable operations which were caused by the values of the virtual optimum operating voltage $V_A$, the MPPT minimum voltage $V_L$, and the MPPT maximum voltage $V_H$ and the like being located to the left (the direction in which the output voltage $V_O$ is low) of the maximum power point $P_M$ (refer to FIG. 4B) are corrected by these values being moved in the direction in which the operation stabilizes.

Further, if the subroutine shown in FIG. 8 is used in the instability detection routine, because the values of the virtual optimum operating voltage $V_A$, the MPPT minimum voltage $V_L$, and the MPPT maximum voltage $V_H$ and the like are recalculated after the operation of the inverter circuit 18 has been stopped, unstable operations caused by factors such as sudden changes in the temperature surrounding the periphery of the solar panel 12 are prevented.

In the solar power generating device 10 of the present embodiment, the low and high voltage change width switching voltages $V_{CL}$ and $V_{CH}$ are used. If the output voltage $V_P$ of the solar panel 12 is a lower value than the low voltage change width switching value $V_{CL}$ or a higher value than the high voltage change width switching value $V_{CH}$, the voltage change widths are increased. If the output voltage $V_P$ of the solar panel 12 falls within a range between the $V_{CL}$ and $V_{CH}$ which is near to the virtual optimum operating voltage $V_A$. the voltage change width is less than the value when the output voltage $V_P$ of the solar panel 12 does not fall within the range between $V_{CL}$ and $V_{CH}$. Therefore the operating point of the solar panel 12 can be moved to the maximum power point in a short time.

In the solar power generating device of the present embodiment, the low and high voltage change width switching voltages $V_{CL}$ and $V_{CH}$ are calculated on the basis of the output voltage $V_P$ of the solar cell 12 immediately before the startup of the inverter circuit 18, the optimum low and high voltage change width switching voltages can be set in accordance with the temperature surrounding the periphery of the solar panel 12 and other seasonal changes.

In addition, in the solar power generating device 10 of the present embodiment, because constant voltage control is carried out during low power output when the operation is unstable, power can be generated in a stable operation from low power output times to high output power times.

In the present embodiment, an explanation was given for when all the voltage values calculated in step 100 were increased by the second predetermined value when the operation was unstable, however, the present invention is not limited to this and the embodiment may, for example, have a constant control voltage VF and/or an instability detection voltage VE which are not increased.

If the instability detection routine shown in FIG. 8 is used, an explanation was given for when all the voltage values calculated in step 100 were recalculated when the operation was unstable, however, the present invention is not limited to this and the embodiment may, for example, have a constant control voltage VF and/or an instability detection voltage VE which are not recalculated.

In the present embodiment, an explanation was given for a determination of whether or not the operation was unstable when in the constant voltage control, however, the present invention is not limited to this and the embodiment may have a determination made when in the MPPT control.

In the present embodiment, the explanation given is for when the output voltage $V_P$ of the solar panel 12 is in a range between the low voltage change width switching voltage $V_{CL}$ and the high voltage change width switching voltage $V_{CH}$, then the voltage change width $V_X$ in MPPT control is set as 2 (V) and when the output voltage $V_P$ of the solar panel 12 is outside the above range then, the voltage change width $V_X$ in MPPT control is set as 4 (V), however, the present invention is not limited to this and the values of these voltage change widths may be changed appropriate to the season, location of the solar panel 12, and the like.

In the present embodiment, the explanation given was for when the constant of the virtual optimum operating voltage VA (or other voltages) calculated immediately before startup of the inverter circuit 18 and the like was multiplied by the constant of the output voltage VP from the inverter circuit 18, however the present invention is not limited to this and the embodiment may have a calculation made, for example, by subtracting a predetermined value from the output voltage VP from the inverter circuit 18.

Additionally, each of the constants used in the present embodiment (for example, the first and second predetermined times and predetermined values in FIG. 6), may be changed where appropriate, in accordance with the season, the location in which the solar panel 12 has been set, and the like.

What is claimed is:

1. A solar power generating device comprising:

a solar cell, said solar cell having an output voltage;

a power converter for converting DC power output of said solar cell into AC power;

a voltage regulator for setting a virtual optimum operating voltage and a control voltage range of said solar cell on the basis of an output voltage of said solar cell immediately before startup of the power converter; and a voltage controller for changing the output voltage of said solar cell in stages by a predetermined voltage change width in the direction in which the DC power output of said solar cell increases in the control voltage range, after the power converter has started up with the virtual optimum operation voltage taken as a target output voltage of said solar cell.

2. A solar power generating device according to claim 1, wherein said voltage regulator sets a switching range, which is a narrower range than the control voltage range and which includes the virtual optimum operating voltage, on the basis of the output voltage of said solar cell immediately before startup of said power converter, and said voltage controller makes the predetermined voltage change width smaller when the output voltage is a value falling inside the switching range than when the output voltage is a value falling outside the switching range when the output voltage of said solar cell is changed in stages.

3. A solar power generating device according to claim 1, wherein said voltage regulator sets a fixed voltage which is a value inside the control voltage range on the basis of the output voltage of said solar cell immediately before startup of said power converter, and said voltage controller sets the output voltage of said solar cell as the fixed voltage when the DC power output of said solar cell is less than a predetermined power amount.

4. A solar power generating device according to claim 2, wherein said voltage regulator sets a fixed voltage which is a value inside the control voltage range on the basis of the output voltage of said solar cell immediately before startup of said power converter, and said voltage controller sets the output voltage of said solar cell as the fixed voltage when the DC power output of said solar cell is less than a predetermined power amount.

5. A solar power generating device according to claim 1, wherein said voltage regulator further sets a fixed voltage on the basis of the output voltage of said solar cell immediately before the startup of said power converter;

said voltage controller has a first mode in which the output voltage of said solar cell is changed in stages by a predetermined voltage change width in the direction in which the DC power output of said solar cell increases in the control voltage range after the virtual optimum operating voltage has been set as a target output voltage of said solar cell and said power converter has been started up, and a second mode in which the output voltage of said solar cell is set as the fixed voltage when the DC power output of said solar cell is smaller than a predetermined power amount; and said solar power generating device further comprising a voltage adjuster which increases at least one of the virtual optimum operating voltage and the control voltage range of said solar cell by a predetermined amount when the output power of said solar cell is unstable.

6. A solar power generating device according to claim 5, wherein said voltage regulator sets a determining reference voltage less than a lower limit of the control voltage range on the basis of the output voltage of said solar cell immediately before the startup of said power converter, and said voltage adjuster determines that the output power of said solar cell is unstable when the output voltage of said solar cell is less than the determining reference voltage.

7. A solar power generating device according to claim 5, wherein said voltage regulator sets a switching range, which is a narrower range than the control voltage range and which includes the virtual optimum operating voltage, on the basis of the output voltage of said solar cell immediately before startup of said power converter, and said voltage controller makes the predetermined voltage change width smaller when the output voltage is a value falling inside the switching range than when the output voltage is a value falling outside the switching range when the output voltage of said solar cell is changed in stages.

8. A solar power generating device according to claim 6, wherein said voltage regulator sets a switching range, which is a narrower range than the control voltage range and which includes the virtual optimum operating voltage, on the basis of the output voltage of said solar cell immediately before startup of said power converter, and said voltage controller makes the predetermined voltage change width smaller when the output voltage is a value falling inside the switching range than when the output voltage is a value falling outside the switching range when the output voltage of said solar cell is changed in stages.

9. A solar power generating device according to claim 1, wherein said voltage regulator further sets a fixed voltage on the basis of the output voltage of said solar cell immediately before the startup of said power converter;

said voltage controller has a first mode in which the output voltage of said solar cell is changed in stages by a predetermined voltage change width in the direction in which the DC power output of said solar cell increases in the control voltage range after the virtual optimum operating voltage has been set as a target output voltage of said solar cell and said power converter has been started up, and a second mode in which the output voltage of said solar cell is set as the fixed voltage when the DC power output of said solar cell is smaller than a predetermined power amount; and said solar power generating device further comprising a voltage adjuster which resets at least one of the virtual optimum operating voltage and the control voltage range of said solar cell on the basis of the output voltage of said solar cell after an operation of said power converter has stopped in accordance with the output power of said solar cell.

10. A solar power generating device according to claim 9, wherein said voltage regulator sets a determining reference voltage less than a lower limit of the control voltage range on the basis of the output voltage of said solar cell immediately before the startup of said power converter, and said voltage adjuster determines that the output power of said solar cell is unstable when the output voltage of said solar cell is less than the determining reference voltage and resets at least one of the virtual optimum operating voltage and the control voltage range.

11. A solar power generating device according to claim 9, wherein said voltage regulator sets a switching range, which is a narrower range than the control voltage range and which includes the virtual optimum operating voltage, on the basis of the output voltage of said solar cell immediately before startup of said power converter, and said voltage controller makes the predetermined voltage change width smaller when the output voltage is a value falling inside the switching range than when the output voltage is a value falling outside the switching range when the output voltage of said solar cell is changed in stages.

12. A solar power generating device according to claim 10, wherein said voltage regulator sets a switching range, which is a narrower range than the control voltage range and which includes the virtual optimum operating voltage, on the basis of the output voltage of said solar cell immediately before startup of said power converter, and said voltage controller makes the predetermined voltage change width smaller when the output voltage is a value falling inside the switching range than when the output voltage is a value falling outside the switching range when the output voltage of said solar cell is changed in stages.

13. A method of generating solar power with a device which tracks the maximum operating point of a solar cell comprising:

generating DC power with the solar cell, said DC power having an output voltage;

converting said DC power into AC power with a power converter;

setting a virtual optimum operating voltage and a control voltage range of said solar cell with a voltage regulator on the basis of an output voltage of said solar cell immediately before startup of the power converter; and changing the output voltage of said solar cell with a voltage controller in stages by a predetermined voltage change width in the direction in which the DC power output of said solar cell increases in the control voltage range, after the power converter has started up with the virtual optimum operation voltage taken as a target output voltage of said solar cell.

14. A method for generating solar power with a device which tracks the maximum operating point of solar cell, comprising:

generating DC power with the solar cell, said DC power having an output voltage;

converting a DC power output of said solar cell into AC power with a power converter;

setting a virtual optimum operating voltage, a control voltage range, and a fixed voltage with a voltage regulator on the basis of an output voltage of said solar cell immediately before the startup of said power converter; and controlling the output voltage in a first mode and a second mode, wherein in the first mode the output voltage of said solar cell is changed in stages by a predetermined voltage change width in the direction in which the DC power output of said solar cell increases in the control voltage range after the virtual optimum operating voltage has been set as a target output voltage of said solar cell and said power converter has been started up, and wherein the output voltage of said solar cell in the second mode is set as the fixed voltage when the DC power output of said solar cell is smaller than a predetermined power amount.

15. The method according to claim 14, further comprising increasing at least one of the virtual optimum operating voltage and the control voltage range of said solar cell by a predetermined amount when the output power of said solar cell is unstable.

16. The method according to claim 15, further comprising setting a determining reference voltage less than a lower limit of the control voltage range and determining that the output power of said solar cell is unstable when the output voltage of said solar cell is less than the determining reference voltage.

17. The method according to claim 15, further comprising setting a switching range, wherein the switching range is a narrower range than the control voltage range and includes the virtual optimum operating voltage, and making said predetermined voltage change width smaller when the output voltage is a value falling inside the switching range than when the output voltage is a value falling outside the switching range when the output voltage of said solar cell is changed in stages.

18. The method according to claim 14, further comprising resetting at least one of the virtual optimum operating voltage and the control voltage range of said solar cell on the basis of the output voltage of said solar cell after an operation of said power converter has stopped in accordance with the output power of said solar cell.

19. The method according to claim 18, further comprising setting a determining reference voltage less than a lower limit of the control voltage range, wherein the output power of said solar cell is determined to be unstable when the output voltage of said solar cell is less than the determining reference voltage and wherein at least one of the virtual optimum operating voltage and the control voltage range are reset.

20. The method according to claim 18, further comprising setting a switching range, which is a narrower range than the control voltage range and which includes the virtual optimum operating voltage, on the basis of the output voltage of said solar cell immediately before startup of said power converter, and said control means makes the predetermined voltage change width smaller when the output voltage is a value falling inside the switching range than when the output voltage is a value falling outside the switching range when the output voltage of said solar cell is changed in stages.

* * * * *